(12) United States Patent
Lavoie

(10) Patent No.: US 11,054,818 B2
(45) Date of Patent: Jul. 6, 2021

(54) VEHICLE CONTROL ARBITRATION

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 274 days.

(21) Appl. No.: 16/271,181

(22) Filed: Feb. 8, 2019

(65) Prior Publication Data
US 2020/0257282 A1    Aug. 13, 2020

(51) Int. Cl.
*G05D 1/00* (2006.01)
*G05D 1/02* (2020.01)

(52) U.S. Cl.
CPC ............... *G05D 1/00* (2013.01); *G05D 1/021* (2013.01)

(58) Field of Classification Search
CPC ..................................................... G05D 1/0011
See application file for complete search history.

(56) References Cited

U.S. PATENT DOCUMENTS

| | | |
|---|---|---|
| 9,189,900 B1 | 11/2015 | Penilla et al. |
| 9,963,106 B1 | 5/2018 | Ricci |
| 2006/0089766 A1* | 4/2006 | Allard ............... G05D 1/0061 701/23 |
| 2016/0288796 A1 | 10/2016 | Yuan |
| 2018/0126986 A1* | 5/2018 | Kim ..................... B60W 30/09 |
| 2018/0211185 A1 | 7/2018 | Rakah et al. |
| 2018/0239349 A1* | 8/2018 | Rasmussen ............ H04L 63/10 |

* cited by examiner

*Primary Examiner* — Genna M Mott
(74) *Attorney, Agent, or Firm* — Frank Lollo; Bejin Bieneman PLC

(57) ABSTRACT

A system includes a processor. The system includes a memory storing instructions executable by the processor to select one of a first message from a first input device or a second message from a second input device based on one of user priority, device priority, or temporal priority. The instructions include instructions to actuate a vehicle based on the selected first or second message.

16 Claims, 5 Drawing Sheets

VEHICLE CONTROL ARBITRATION

BACKGROUND

A vehicle computer may receive messages from one or more input devices. The input devices typically provide the messages in response to user inputs to the input devices. The messages typically specify commands from a user to actuate one or more components of the vehicle. For example, the messages may indicate a user is commanding the vehicle to actuate an ignition, lock or unlock doors, open or close windows, etc.

DETAILED DESCRIPTION

Introduction

Figure 1:
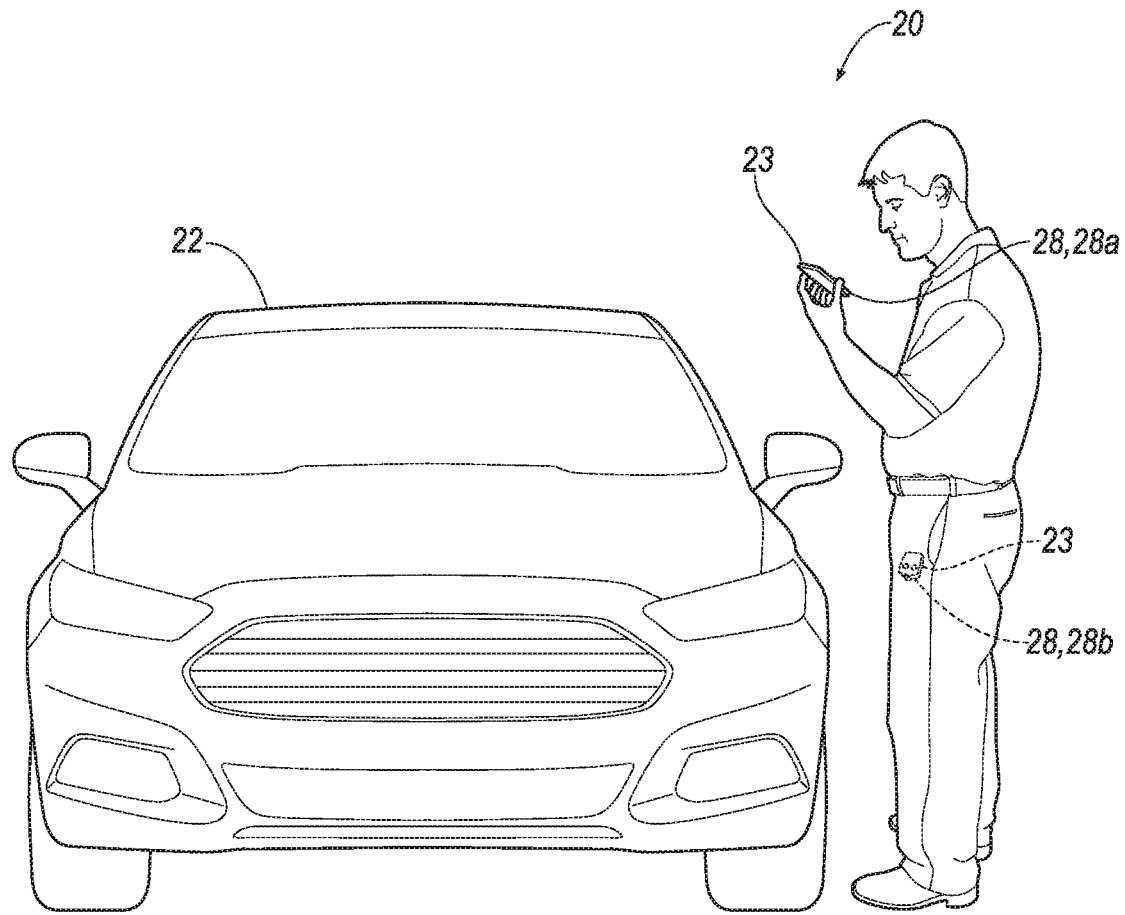
FIG. 1 is a front view of a vehicle and a system for arbitrating among respective messages to the vehicle from a plurality of input devices.
Figure 2:
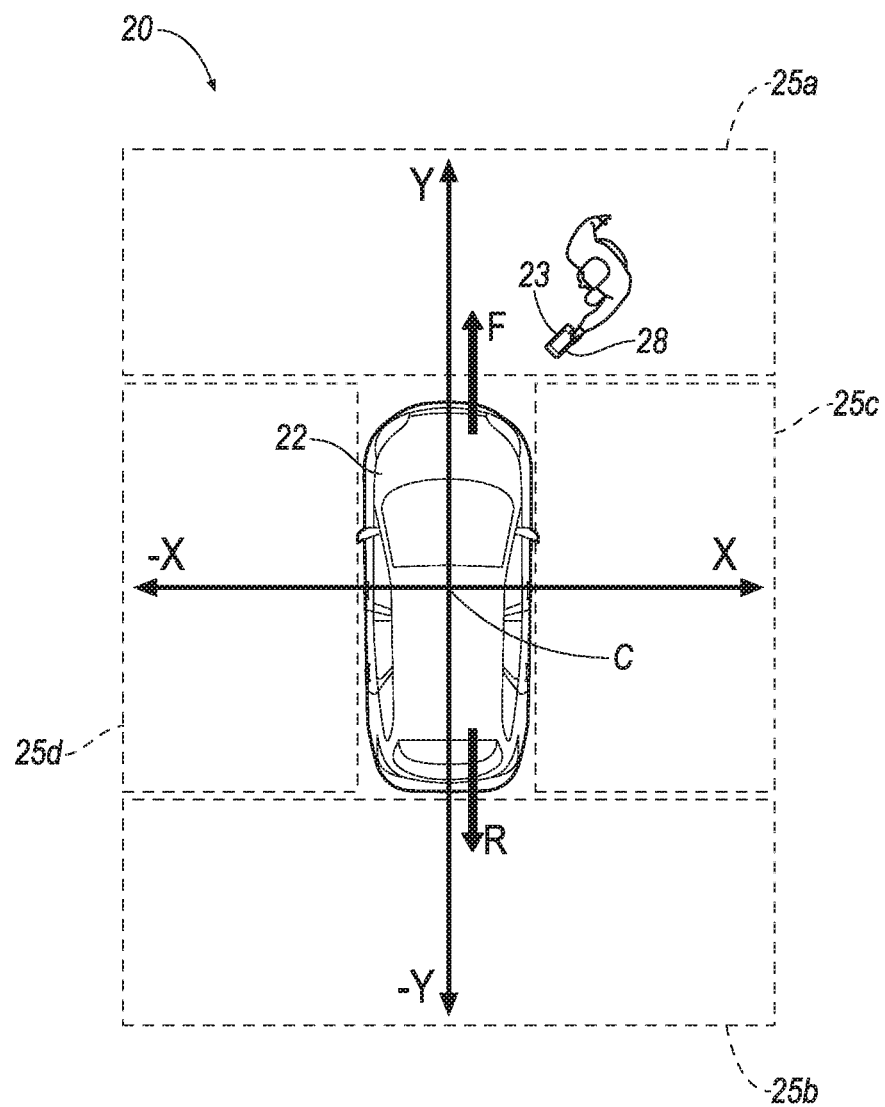
FIG. 2 is a diagram of the system of FIG. 1.
Figure 3:
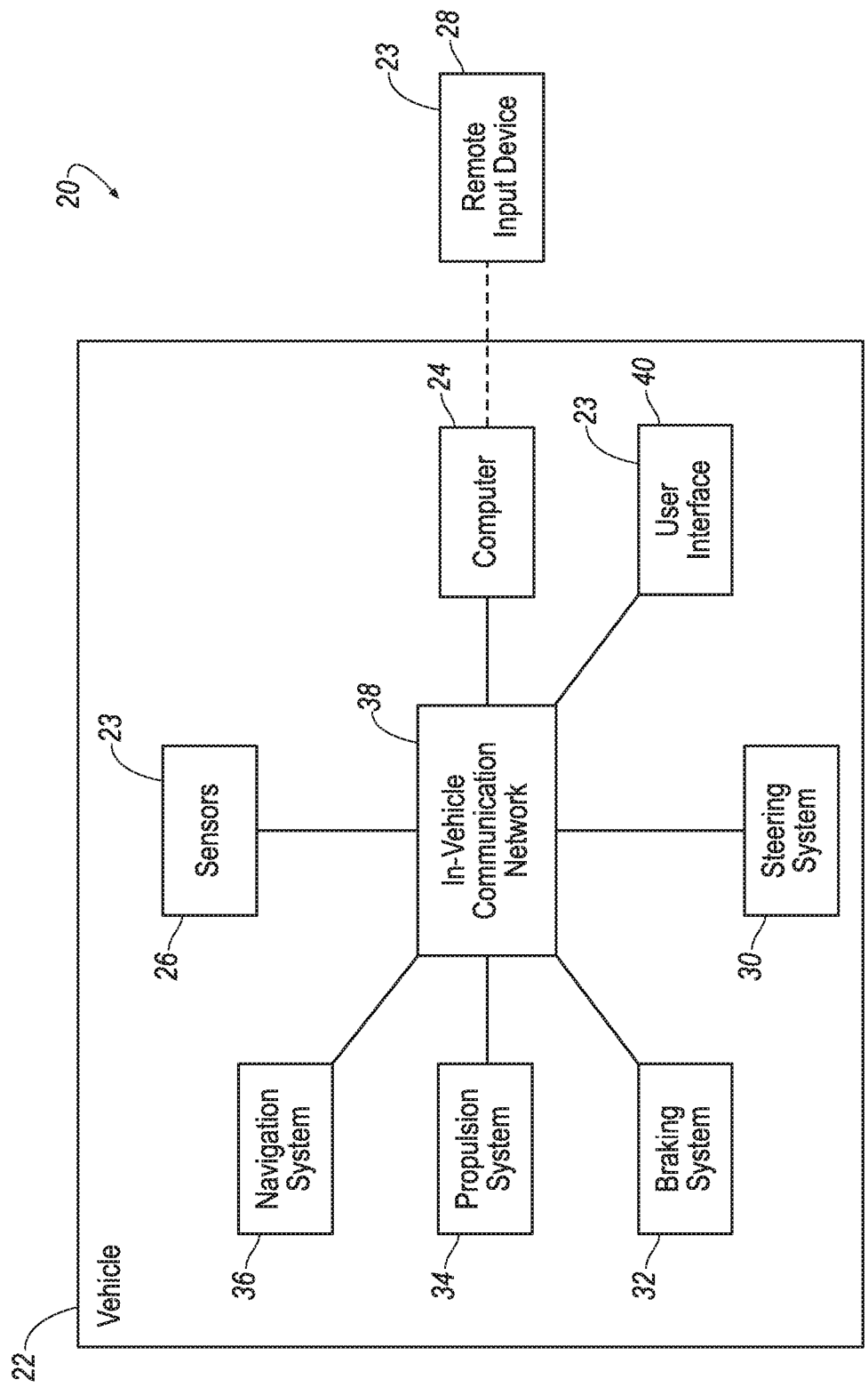
FIG. 3 is a block diagram of components of the system and the vehicle of FIG. 1.

With reference to FIGS. 1 and 2, wherein like numerals indicate like parts throughout the several views, a system 20 for arbitrating among respective messages received from respective input devices 23 instructing control of a vehicle 22 can select one of a first message from a first input device 23 or a second message from a second input device 23 based on a user priority, device 23 priority, or temporal priority. For example, the system 20 may include a computer 24 including a processor and a memory storing instruction executable by the processor to select one of a first message from a first input device 23 or a second message from a second input device 23 based on user priority, device 23 priority, or temporal priority. The system 20 can actuate the vehicle 22 based on the selected first message or second message. For example, the instructions stored in the memory of the computer 24 may include instructions to actuate the vehicle 22 based on the selected first or second message. The system 20 can refrain from actuating the vehicle 22 based on the first message or second message that was not selected, i.e., can ignore the command(s) included in unselected message(s). For example, the instructions stored in the memory of the computer 24 may include instructions to refrain from actuating the vehicle 22 based on the first message or the second message that was not selected. The adjectives "first," "second," etc. are used throughout this document as identifiers and are not intended to signify importance or order The input devices 23 provide for communication between a user and the computer 24 of the vehicle 22. The input device 23 may be a component of the vehicle 22, such as sensors 26 (e.g., a microphone or camera in the vehicle 22) or a human-machine (user) interface 40. The input device 23 may be remote from the vehicle 22, such as a remote input device 28 in wireless communication with the vehicle 22.

The messages from the input devices 23 to the computer 24 of the vehicle 22 include data specifying a command from the user. The messages may include one or more packets of data. Packets typically may include a header portion. The header portion may include bytes of data specifying a time of transmission, an identifier for the input device 23, an identifier for a user of the input device 23, and/or a type of the input device 23, as described further below. Further, packets typically include a payload portion. The payload portion may include bytes of data specifying a command, e.g., commanding the vehicle 22 enter or exit a parking location, navigate to a specified location, stop the vehicle 22 (bring vehicle speed to zero), increase or decrease speed of the vehicle 22, lock or unlock doors of the vehicle 22, open or close doors or a trunk of the vehicle 22, play specified media content such as a podcast or song, etc.

Selecting one of the messages based on user priority, device 23 priority or temporal priority allows the computer 24 to arbitrate among multiple messages from multiple input devices 23. For example, the computer 24 can actuate the vehicle 22 when the messages contradict one another, such as if the first message from the first input device 23 includes a command to accelerate the vehicle 22, e.g., to execute a parking maneuver, and the second message from the second input device 23 includes a command to decelerate the vehicle 22, e.g., to bring the vehicle 22 to a stop.

System

A remote input device 28 is remote from the vehicle 22 and communicates wirelessly with the computer 24 of the vehicle 22. For example, the remote input device 28 may be configured for using wireless protocols, e.g., Bluetooth®, IEEE 802.11 (colloquially referred to as WiFi®), satellite telecommunication protocols, and cellular protocols such as 3G, LTE, etc. A remote input device 28 includes circuits, chips, and an antenna. The remote input device 28 may include a processor and a memory storing instructions executable by the processor. The remote input device 28 includes one or more user interfaces. The user interfaces receive an input from a user, and the remote input device 28 transmits a message to the computer 24 based on such input. Example user interfaces include buttons, switches, touch screen displays, microphones, speakers, etc. Example remote input devices 28 include smart phones, tablet computers, personal computers, and key fobs.

The vehicle 22 may be any type of powered passenger or commercial automobile with two or more wheels, or could be an airplane or boat. Examples of the vehicle 22 include a car, a truck, a sport utility vehicle, a crossover vehicle, a van, a minivan, a taxi, a bus, etc.

The vehicle 22 defines directions used herein, e.g., forward, rearward, right, left, etc., The directions used herein may be relative to an orientation of controls for operating the vehicle 22, e.g., an instrument panel, steering wheel, etc.

The vehicle 22 includes a steering system 30. The steering system 30 controls a steering angle of wheels of the vehicle 22, e.g., in response to a command from the computer 24, in response to an operator input, such as to a steering wheel, or combination of the two such in the case of driver assistive technologies. The steering system 30 may be a rack-and-pinion system with electric power-assisted steering, a steer-by-wire system, or any other suitable system for controlling the steering angle of the wheels. The steering system 30 is in communication with the computer 24.

The vehicle 22 includes a braking system 32. The braking system 32 resists motion of the vehicle 22 to thereby slow and/or stop the vehicle 22, e.g., in response to a command from the computer 24 and/or in response to an operator input, such as to a brake pedal. The braking system 32 may include friction brakes such as disc brakes, drum brakes, band brakes, etc.; regenerative brakes; any other suitable type of brakes; or a combination. The braking system 32 is in communication with the computer 24.

The vehicle 22 includes a propulsion system 34. The propulsion system 34 translates energy into motion of the vehicle 22, e.g., in response to a command from the computer 24 and/or in response to an operator input, such as to an accelerator pedal. For example, the propulsion system 34 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the vehicle 22. The propulsion system 34 is in communication with the computer 24.

The vehicle 22 includes sensors 26. The sensors 26 may detect internal states of the vehicle 22, for example, wheel speed, wheel orientation, and engine and transmission variables. The sensors 26 may detect the position or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 26 may detect the external world, for example, radar sensors, scanning laser range finders, light detection and ranging (LIDAR) devices, microphones, and image processing sensors such as cameras. The vehicle 22 may further include communications devices, for example, vehicle-to-infrastructure (V2I) or vehicle-to-vehicle (V2V) devices. The sensors 26 may be supported or mounted at numerous locations on or in the vehicle 22. For example, an accelerometer may be attached to a window of the vehicle 22. The accelerometer attached to the window may be configured to function as a microphone by detecting vibration of the window to which it is attached. The sensors 26 are in communication with the computer 24.

The vehicle 22 may include a navigation system 36 that can determine a location of the vehicle 22. The navigation system 36 is implemented via circuits, chips, or other electronic components. The navigation system 36 may be implemented via satellite-based system such as the Global Positioning System (GPS). The navigation system 36 may triangulate the location of the vehicle 22 based on signals received from various satellites in the Earth's orbit. The navigation system 36 is programmed to output signals representing the location of the vehicle 22 to, e.g., to the computer 24 via a communication network 38. In some instances, the navigation system 36 is programmed to determine a route from the present location to a future location. The navigation system 36 may access a virtual map stored in memory of the navigation system 36 and/or computer 24, and develop the route according to the virtual map data. The virtual map data may include lane information, including a number of lanes of a road, widths and edges of such lanes, etc. The navigation system 36 may be in communication with the computer 24.

The vehicle 22 may include a user interface 40. The user interface 40 presents information to and receives information from an occupant of the vehicle 22. The user interface 40 may be located, e.g., on the instrument panel in a passenger cabin of the vehicle 24, or wherever may be readily seen by the occupant. The user interface 40 may include dials, digital readouts, screens such as a touch-sensitive display screen, speakers, and so on for providing information to the occupant, e.g., human-machine interface (HMI) elements. The user interface 40 may include buttons, knobs, keypads, microphone, and so on for receiving information from the occupant. The user interface 40 may be in communication with the computer 24.

The vehicle 22 may include the communication network 38. The communication network 38 includes hardware, such as a communication bus, for facilitating communication among vehicle components, such as the computer 24, the propulsion system 34, the steering system 30, the navigation system 36, the braking system 32, the sensors 26, and the user interface 40. The communication network 38 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 24, implemented via circuits, chips, or other electronic components, is included in the system 20 for carrying out various operations, including as described herein. The computer 24 is a computing device that generally includes a processor and a memory, the memory including one or more forms of computer-readable media, and storing instructions executable by the processor for performing various operations, including as disclosed herein. The memory of the computer 24 further generally stores remote data received via various communications mechanisms; e.g., the computer 24 is generally configured for communications on the communication network 38 or the like, and/or for using other wired or wireless protocols, e.g., Universal Serial Bus (USB), Bluetooth®, IEEE 802.11 (colloquially referred to as WiFi®), satellite telecommunication protocols, and cellular protocols such as 3G, LTE, etc. The computer 24 may also have a connection to an onboard diagnostics connector (OBD-II). Via the communication network 38 and/or other wired or wireless mechanisms, the computer 24 may transmit and/or receive messages to and/or from various devices of the vehicle 22 or remote from the vehicle 22, e.g., the steering system 30, the braking system 32, the propulsion system 34, the navigation system 36, the sensors 26, the user interface 40, the remote input device 28, etc. Although one computer 24 is shown in FIG. 2 for ease of illustration, it is to be understood that the computer 24 could include, and various operations described herein could be carried out by, one or more computing devices, including computing devices remote from and in communication with the vehicle 22.

The computer 24 may be programmed to, i.e., the memory may store instructions executable by the processor to, operate the vehicle 22 in an autonomous mode, a semi-autonomous mode, or a non-autonomous mode. For purposes of this disclosure, the autonomous mode is defined as one in which each of propulsion system 34, the braking system 32, and the steering system 30 are controlled by the computer 24; in a semi-autonomous mode the computer 24 controls one or two of the propulsion system 34, the braking system 32, and the steering system 30; in a non-autonomous mode, a user controls the propulsion system 34, the braking system 32, and the steering system 30.

Operating the vehicle 22, e.g., in the autonomous mode and/or semi-autonomous mode, may include increasing or decreasing vehicle speed, changing course heading, etc. Operating the vehicle 22 may include executing a specific maneuver, e.g., entering or exiting a parking location. Operating the vehicle 22 may include navigating the vehicle 22 along one more roads to a destination, maintaining and/or changing lanes of a road, avoiding obstacles, etc. The computer 24 may operate the vehicle 22 by transmitting commands to the steering system 30, the braking system 32, and the propulsion system 34 based on information from the navigation system 36 and sensors 26. For example, the computer 24 may transmit commands to the steering system 30, the braking system 32, and/or the propulsion system 34 indicating a change in wheel angle, an increase or decrease in resistance to movement of the vehicle 22, and/or an increase or decrease in power output, respectively.

The computer 24 may be programmed to determine whether one or more messages conflict with each other. Messages conflict with each other when commands of the messages cannot be executed without interfering with each other, e.g., messages conflict when executing their respective commands would achieve inconsistent or contradictory results. For example, a message including a command to unlock a door of the vehicle conflicts with a message including a command to lock the door of the vehicle. As another example, a message including a command to actuate the propulsion system 34 to accelerate the vehicle conflicts with a message including a command to actuate the braking system 32 to decelerate the vehicle. The computer 24 may determine whether one or more messages conflict with each other with a look up table or the like that includes groups of commands that conflict with each other. The computer 24 may determine that messages conflict when commands included in the message are of a same group. An example look up table is shown below:

TABLE 1

| Group | Conflicting Commands |
|---|---|
| 1 | Unlock doors; lock doors. |
| 2 | Open trunk; close trunk. |
| 3 | Accelerate vehicle; decelerate vehicle. |
| 4 | Increase media volume; decrease media volume. |

The look up table may be stored in memory of the computer 24. The look up table may be populated by a manufacturer of the vehicle 22 and/or of the computer 24. Groups of commands stored in the look up table may be identified by identifying commands that may be executed by the computer 24 that conflict with each other. For example, a human may manually identify and provide conflicting commands to the look up table based on an understanding of an intent and outcome of the commands. As another example, a computer may provide conflicting commands to the look up table by identifying commands directed to a same component but having different values (e.g., lock/unlock, up/down, open/close etc.) For example, a command to unlock doors could be identified as in conflict with a command to lock doors based on the common component (door lock) and different values (lock/unlock) of the commands.

The computer 24 may be programmed to select one of a first message from a first input device 23 or a second message from a second input device 23 based on user priority. User priority is priority based on an identification of a user providing input to an input device 23. In other words, the computer 24 may select the message associated with the user and/or device 23 associated with the user having the highest priority. The computer 24 may identify the user based on data specifying the identity of the user in the message from the input device 23. For example, the data in the message from the input device 23 may include a user name, email address, or other unique identifier associated with the user. The input device 23 may be provided with such identification by the user, e.g., the user may sign in to an application or operating system on a smart phone with a user name, email address, biometric information (such as fingerprint or face recognition), etc. The computer 24 may identify the user by an identity of the user stored for a specified input device 23. The computer 23 may identify the input device 23 based on data in the message specifying the identity of the input device 23, e.g., a serial number of the input device 23, a device 23 media access control address (MAC address), a unique name for the input device 23, etc. The computer 24 may alternatively or additionally identify the user by analyzing the input to the input device 23. For example, the computer 24 may execute conventional voice recognition techniques to identify a user providing a voice input to a microphone, accelerometer fixed to a window of the vehicle 22, etc. The computer 24 may associate a pitch, a tone, etc., of a detected voice with a certain user. The computer 24 may select one of the first message or the second message based on the identity of the user with a lookup table or the like stored in the memory and associating various identities with various priority levels. An example look up table is shown below:

TABLE 2

| User Identity | Priority Level |
|---|---|
| John Doe | 2 |
| Jane.doe@email.com | 1 |
| JJ1234 | 3 |

The look up table may be populated based on input to the computer 24, e.g., from the remote input device 28 (such as a smart phone or tablet computer), from the user interface 40, etc. For example, a user may provide input to a smartphone specifying a user identity and associated priority level. The smartphone may transmit data including the specified user identity and associated priority level to the computer 24. The computer 24 can add the specified user identity and associated priority level to the look up table. The look up table may alternatively or additionally be populated by a manufacturer of the vehicle 22, e.g., specifying priorities of users and/or of input devices 23 associated with users. For example, a manufacturer of the vehicle may populate the look up table to include user identities of an owner of the vehicle as associated with a highest level of priority, and user identities of one or more secondary users as associated with lower levels of priority.

The computer 24 may be programmed to assign a lowest level of priority to user identities not included in the look up table. In other words, the computer 24 can select a message from any user identity included in the look up table as having higher priority than a message from any user identity not included in the look up table.

The computer 24 may be programmed to select one of a first message from a first input device 23 or a second message from a second input device 23 based on device 23 priority. Device 23 priority is priority based on a type of the input device 23 providing the message to the computer 24. In other words, the computer 24 may select the message sent from the type of input device 23 having the highest priority. The type of the input device 23 is a categorical assignment based on physical and functional characteristics of the input device 23. For example, a "general remote" type may be defined for remote input devices 28, e.g., smart phones, tablet computers, etc., that can remotely communicate with the computer 24 and are capable of operations other than providing commands to the vehicle 22 in addition to providing commands to the vehicle 22, e.g., by user input to a touch screen interface. As another example, a "dedicated remote" type may be defined for remote input devices 28 that can remotely communicate with the computer 24 and are not capable of operations not related to the vehicle 22, e.g., a key fob. As a final example, an "in-vehicle" type of input device 23 may be defined for input devices 23 included in or on the vehicle 22, and permanently connected (at least when the vehicle 22 is powered on) to the communication network 38. In this context, a sensor 26, a user interface 40 of the vehicle 22 (such as a human machine interface (HMI)), etc., could operate as an in-vehicle input device 23.

The computer 24 may determine a type of an input device 23 based on data specifying the type in the message. For example, the message may include data specifying that that the input device 23 is of a certain type. As another example, the computer 24 may determine the type of the input device 23 based on the message, e.g., the computer 23 may determine the input device 23 is an "in-vehicle" type based on receiving the message via the communication network 38. The computer 24 may select one of the first message or the second message based on the type of the user with a lookup table or the like stored in the memory and associating various types with various priority levels. An example look up table is shown below:

TABLE 3

| Input Device Type | Priority Level |
| --- | --- |
| General Remote Type | 2 |
| Dedicated Remote Type | 3 |
| In-Vehicle Type | 1 |

The look up table may be populated based on input to the computer 24, e.g., from the remote input device 28 (such as a smart phone or tablet computer), from the user interface 40, etc. For example, a user may provide input to a smartphone specifying a device type and associated priority level. The smartphone may transmit data including the device type and associated priority level to the computer 24. The computer 24 can add the specified user identity and associated priority level to the look up table. As another example, a user may provide input to a smartphone specifying a certain input device 23 as being of a certain type. The smartphone may transmit data including the certain input device 23 and type of such input device 23 to the computer 24. The computer 24 may store such data. The look up table may be populated by a manufacturer of the vehicle 22. For example, a manufacturer may populate the look up table based on empirical studies that may include statistical data regarding various types of input device 23. The statistical data may show when one type of input device 23 is statistically more likely to provide commands that reflect an intent of a user of the input device 23. For example, a "general remote" type may be shown to more accurately provide commands reflecting an intent of a user than a "dedicated remote" type. In such example, an input to a touch screen of the smart phone to open an application for controlling the vehicle 22 followed another input to the touch screen to select an unlock command is statistically less likely to be provided in error (i.e., contrary to user intent) compared to pressing a lock button on a key fob (which may accidently occur while the key fob is in the user's pocket).

The computer 24 may be programmed to select one of a first message from a first input device 23 or a second message from a second input device 23 based on temporal priority. Temporal priority is priority based on time. In other words, the computer 24 selects the message that was transmitted first. The computer 24 may determine which message was transmitted first by data specifying the respective times of transmission in the messages. The computer 24 may store and compare such times.

The computer 24 may be programmed to select one of a first message from a first input device 23 or a second message from a second input device 23 based on based on respective locations of the first input device 23 and the second input device 23 relative to the vehicle 22 and/or locations of users providing the inputs relative to the vehicle 22.

A location of a device 28 can be specified relative to the vehicle 22, i.e., according to a direction of the input device 23 and/or the user relative to the vehicle 22, e.g., in front of the vehicle 22, behind the vehicle 22, to a right side of the vehicle 22, and/or to left side of the vehicle 22. The computer 24 may identify the direction based on an angle of the device 28 relative to the vehicle 22, e.g., where 0 degree is directly in front (i.e., on a longitudinal axis -Y,Y) of the vehicle 22; 90 degrees is directly to the right (i.e., on a lateral axis -X,X that is perpendicular to the longitudinal axis) of the vehicle 22; 180 degrees is directly behind (i.e., on the longitudinal axis of) the vehicle 22; 270 degrees is directly to the left of (i.e., on the lateral axis of) the vehicle 22, etc. A center C of the vehicle (i.e., an intersection of the lateral and longitudinal axes at their respective midpoints), or some other selected point, may be a vertex of the angle. The computer 24 may identify the location based on predetermined quadrants 25a, 25b, 25c, 25d around the vehicle 22. For example, a quadrant 25a may be in front of the vehicle 22, a quadrant 25b may be behind the vehicle 22, a quadrant 25c may be to the right of the vehicle 22, and a quadrant 25d may be to the left of the vehicle 22. The quadrants 25a, 25b, 25c, 25d may be defined by an x, y coordinate system having an origin at a center of the vehicle. Positive and negative x values may specify right and left distances from the center of the vehicle 22, respectively. Positive and negative y values may specify forward and rearward distances from the center of the vehicle 22, respectively.

In the example shown in FIG. 2, the computer 24 can determine the location of a remote input device 28 as being in front of the vehicle 22 based on identifying that the input device 28 is in the quadrant 25a. The computer 24 may select a message from the remote input device 28 in front of the vehicle 22 when the vehicle 22 is navigating in a vehicle forward direction F. Selecting the message from the remote input device 28 in front of the vehicle 22 when the vehicle 22 is navigating in the vehicle forward direction F increases a likelihood that the message is provided from a vantage point that has visibility of objects relative to the navigation direction. As another example, the computer 24 may select a message from an input device 23 behind the vehicle 22, e.g., in the quadrant 25b, when the vehicle 22 is navigating in a vehicle rearward direction R.

The location relative to the vehicle 22 may include a proximity of the input device 23 and/or the user providing the input to the vehicle 22, i.e., a linear distance from the vehicle 22 to the input device 23 and/or the user providing the input. The computer 24 may select the message from the input device 23 and/or the user providing the input that is most proximate, i.e., closest to, the vehicle 22.

The computer 24 may determine the location of an input device 23 or user relative to the vehicle 22 based on information from the input device 23 (e.g., include in the message), from the navigation system 36, and/or from the sensors 26. For example, a message from a remote input device 28 (such as a smart phone) may include a location of the remote input device 28. The navigation system 36 may provide a location of the vehicle 22. The locations of the remote input device 28 (such as a smart phone) and the vehicle 22 may be determined with GPS, triangulation of cellular signals from multiple cellular towers, and/or data from the sensors 26 of the vehicle or a sensor in the remote input device 28, such as based on data from accelerometers and typically referred to as "dead reckoning". The sensors 26 and/or navigation system 36 may provide a compass heading direction of the vehicle 22, e.g., that forward F of the vehicle 22 is north. The computer 24 may determine the proximity of the vehicle 22 based on the linear distance between the locations of the vehicle 22 and the remote input device 28. The computer 24 may determine the direction of the remote input device 28 from the vehicle 22 by comparing the compassing heading direction and the location of the vehicle 22 with the location of the remote input device 28. As another example, sensors 26 of the vehicle 22 may be configured to detect a remote input device 28 (such as a key fob) and determine a location of the remote device 28 relative to the vehicle. For example, the computer 24 may triangulate a location of the remote input device 28 relative to vehicle 22 based on data from the sensors 26 detecting the remote input device 28, e.g., using conventional techniques such as time of flight, angle of arrival, etc. One such technique is described in US Patent Application Publication No. 2018/0134212.

The computer 24 may determine a location of the user providing the input based on data from the sensors 26. For example, the computer 24 may triangulate a location of the user relative to vehicle 22 based on data from the sensors 26, e.g., microphones and/or accelerometers fixed to windows, detecting a voice command from the user. The computer 24 may use conventional triangulation techniques based on difference in volume of the voice command detected by various sensors 26, a timing of the voice command detected by the various sensors 26, etc.

The computer 24 may determine a navigation direction of the computer 24 based on data from the navigation system 36, the sensors 26, etc., e.g., using conventional techniques.

The computer 24 may be programmed to select one of a first message from a first input device 23 or a second message from a second input device 23 by executing the various priority determinations described above in a specified order. For example, the computer 24 may first determine whether the first message or the second message can be selected based on user priority. If one of the messages can be selected based on user priority, the computer selects such message. If one of the messages cannot be selected based on user priority, e.g., both messages have the same user priority, the computer 24 may then determine whether the first message or the second message can be selected based on device 23 priority. If one of the messages can be selected based on device 23 priority, the computer selects such message. If one of the messages cannot be selected based on device 23 priority, e.g., both messages have the same device 23 priority, the computer 24 may then determine whether of one the messages can be selected based on another priority, e.g., temporal priority, based on locations of the devices 23, etc., and so on.

The specified order in which the various priority determinations are executed can be determined by data specifying an order of priority determinations. The order of priority determinations may be stored in memory of the computer 24 and/or based on based on input to the computer 24, e.g., from the remote input device 28 (such as a smart phone or tablet computer), from the user interface 40, etc. For example, a user may provide input to a device 23 such as a smartphone specifying an order of priority determinations. The device 23 may transmit data including the order of priority determinations may to the computer 24. The order of priority determinations may alternatively or additionally be provided by a manufacture of the vehicle 22 and/or computer 24, e.g., based on case studies or the like.

The computer 24 may store multiple orders of the priority determinations and can be programmed to select one of such orders based on commands in the messages. The computer 24 may store a look up table or the like associating various commands with various orders of the priority determinations. An example look up table is shown below:

TABLE 4

| Command(s) | Order of Priority Determinations |
| --- | --- |
| Lock/Unlock Doors Locks; Open/Close Door | 1. Device Priority<br>2. User Priority<br>3. Location Based Priority<br>4. Temporal Priority |
| Navigate vehicle; Accelerate/Decelerate Vehicle; Execute Maneuver | 1. Location Based Priority<br>2. User Priority<br>3. Temporal Priority<br>4. Device Priority |
| Play Media; Adjust Media Volume | 1. User Priority<br>2. Temporal Priority<br>3. Location Based Priority<br>4. Device Priority |

In addition to the orders of the priority determinations in the look up table, the computer 24 may also store a default order of priority determinations. The computer 24 may execute the various priority determinations according to the default order of priority determinations when the commands of the messages are not included in the look up table.

The orders of the priority determinations and commands in the look up table and the default order of priority may be provided by input to the computer 24, e.g., from the remote input device 28 (such as a smart phone or tablet computer), from the user interface 40, etc., and/or provided by a manufacture of the vehicle and based on case studies or the like e.g., as described above.

The computer 24 may be programmed to provide conflicted commands to a user, e.g., on a screen of the remote input device 28 (such as a smart phone or tablet computer), the user interface 40, etc., so that the user can provide input to resolve the conflict between the commands. For example, the computer 24 may transmit a command to the remote input device 28 (such as a smart phone or tablet computer), the user interface 40, etc., specifying the conflicted commands. The computer 24 is programmed to provide the conflicted commands to the user when neither of the commands in the messages can be determined to have priority over the other. For example, the computer 24 provides the conflicted commands to the user when the various priority determinations described herein specify that the commands have a same priority. A user may provide input to the remote input device 28 (such as a smart phone or tablet computer), the user interface 40, etc., selecting one of the conflicted commands, and such input may be transmitted to the computer 24. The computer 24 can receive the selected command and specify the first message or the second message as the selected message based on the selected command (i.e., whichever message includes the selected command).

The computer 24 may be programmed to actuate the vehicle 22 based on the selected first or second message. For example, the selected message may include a command to execute a maneuver, e.g., to enter or exit a parking location, to bring the vehicle 22 to a stop, etc. The computer 24 may transmit commands to one or more of the braking system 32, the steering system 30, the propulsion system 34, etc., to execute the command and based on information from the navigation system 36, the sensors 26, etc. As another example, the selected message may include a command to actuate a vehicle component, e.g., to actuate locks of doors of the vehicle 22 to a locked state or an unlocked state, to actuate a media system of the vehicle 22 to play certain media and/or change volume, etc.

The computer 24 may be programmed to refrain from actuating the vehicle 22 based on the first message or the second message that was not selected, i.e., to ignore a command or commands in the unselected message(s). In other words, the computer 24 may refrain from actuating the vehicle 22 based on the second message when the first message is selected, and vice versa. The computer 24 may refrain from actuating the vehicle 22 by not sending commands to vehicle components to execute the command included in the message that was not selected. For example, the message that is not selected may include a command to execute a maneuver, and the computer 24 may refrain from transmitting commands to the braking system 32, the steering system 30, the propulsion system 34, etc. In other words, the computer 24 may ignore the command included in the message that was not selected.

Process

Figure 4A:
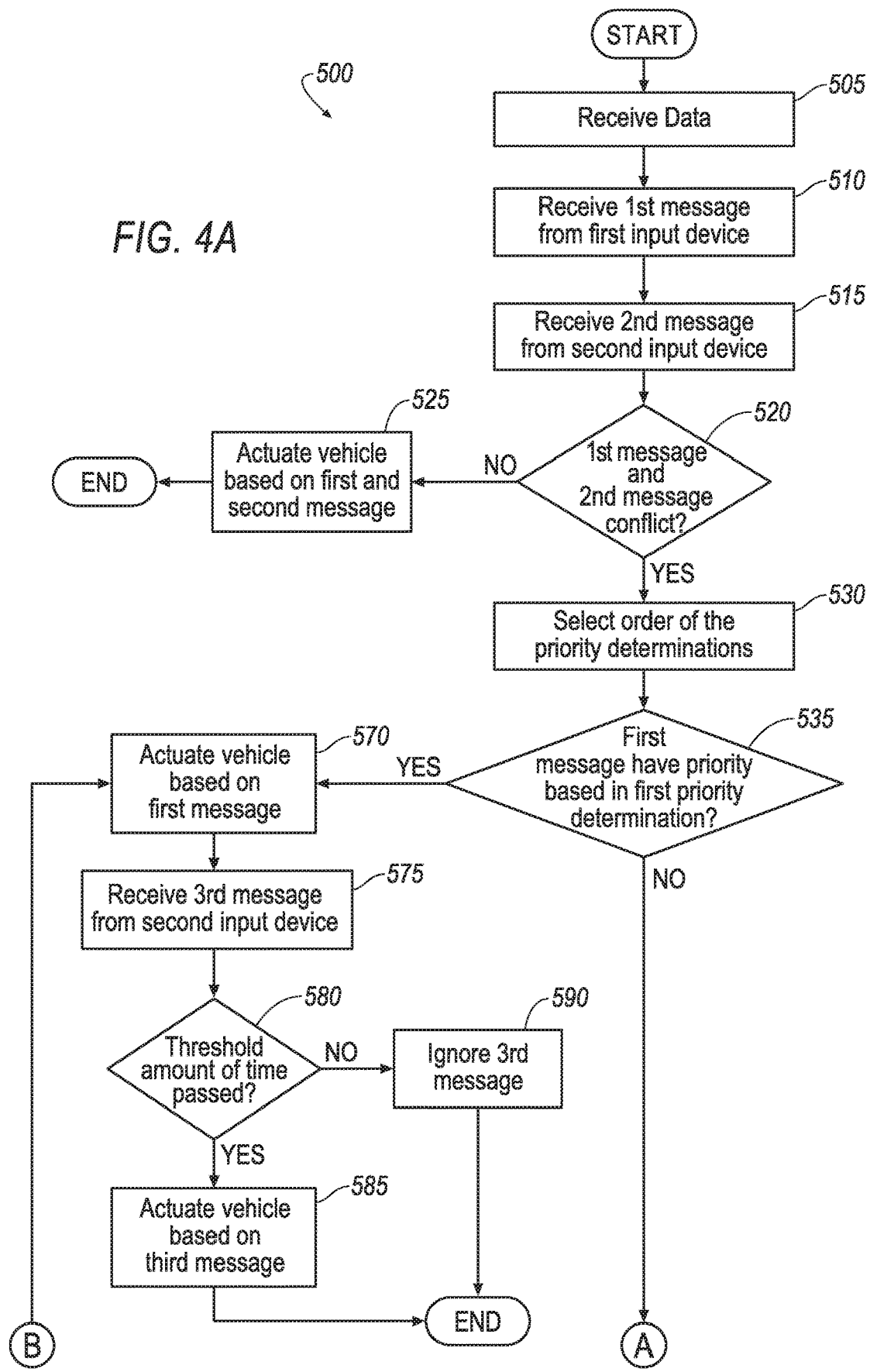
FIG. 4A is a flow chart illustrating a process for controlling the vehicle of FIG. 1.
Figure 4B:
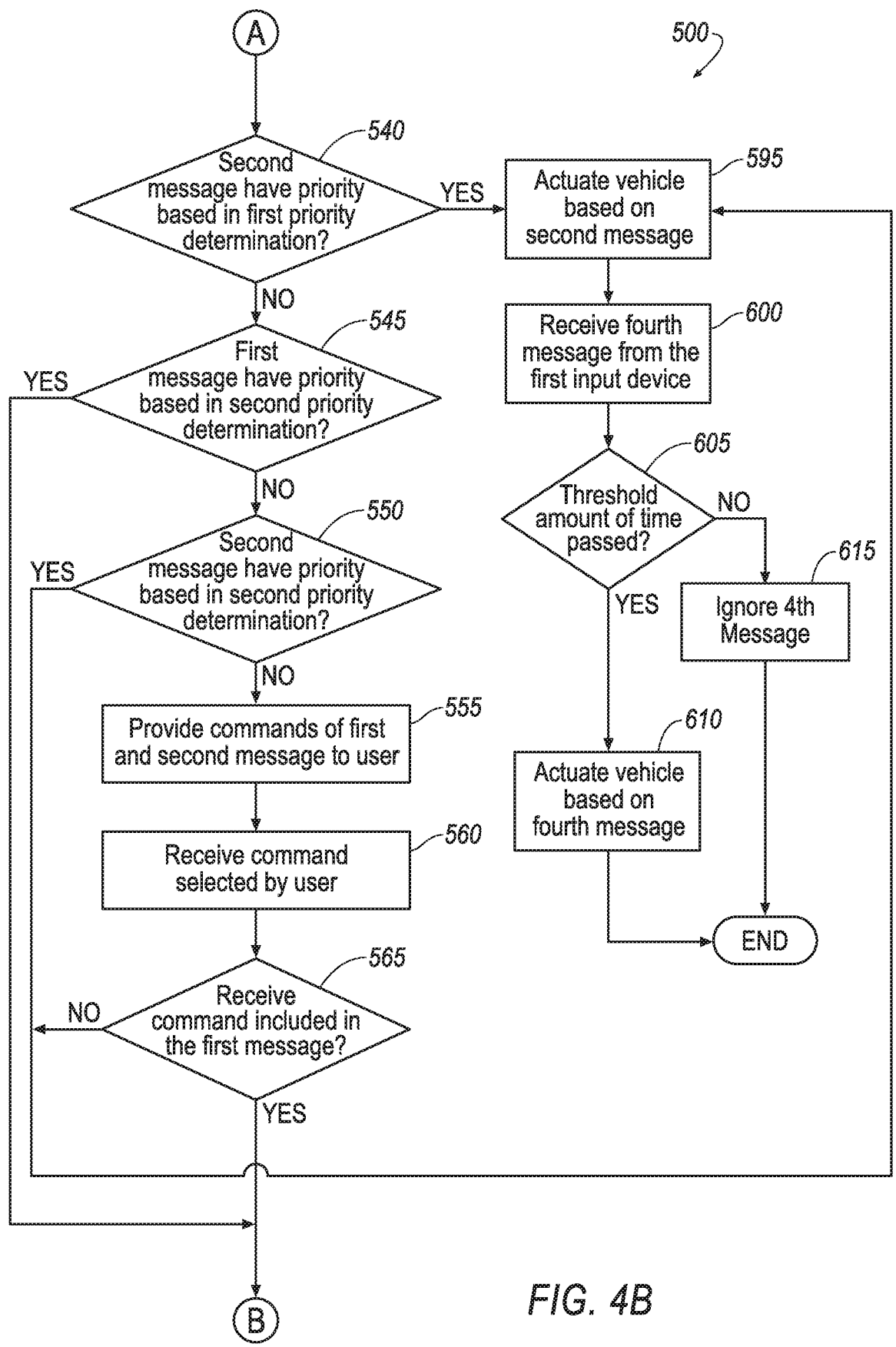
FIG. 4B is a continuation of the flow chart of FIG. 4A.

FIGS. 4A and 4B illustrate a process flow diagram for an exemplary process 500 for operating a vehicle 22. The process 500 begins in a block 505 in which the computer 24 of the vehicle 22 receives data from the sensors 26, the navigation system 36, etc., e.g., via the communication network 38. The computer 24 may receive such data substantially continuously or at time intervals, e.g., every 50 milliseconds. The computer 24 may store the data, e.g., on the memory.

At a block 510, the computer 24 receives a first message from a first input device 23. For example, the computer 24 may receive a message from one or more sensors 26, a remote input device 28, etc. The computer 24 may receive the message via the communication network 38, wirelessly, etc.

For example, as shown in FIG. 1, the computer 24 may receive a first message from a remote input device 28a such as a smart phone that receives user input. The computer 24 may identify that the remote input device 28a is a "general remote" type. The first message may specify a command that doors of the vehicle 22 be locked.

At a block 515, the computer 24 receives a second message from a second input device 23. The second input device 23 is a different device than the first input device 23. For example, if the first input device 23 is a sensor 26, the second input device 23 may be a different sensor 26 or a remote input device 28. As another example, if the first input device 23 is a remote input device 28, the second input device 23 may be a different remote input device 28 or a sensor 26.

For example, as shown in FIG. 1, the computer 24 may receive a second message from a remote input device 28b such as a key fob that provided input due to inadvertent pressing of a button on the fob while in a pocket of the user. The computer 24 may identify that the remote device 28b is a "dedicated remote" type. The message may specify a command that doors of the vehicle 22 be unlocked.

Although not illustrated in the process 500, the computer 24 may receive additional messages from additional input devices 23. In other words, the computer 24 may receive a third message from a third input device 23, a fourth message from a fourth input device 23, etc.

Next, at a block 520 the computer 24 determines whether commands of the first message and the second message conflict with each other. Upon a determination that commands of the first message and the second message do not conflict with each other, the process 500 moves to a block 525. Upon a determination that the commands of the first message and the second message conflict with each other, the process 500 moves to a block 530.

For example, with reference to the above example first and second messages transmitted by the first and second remote input devices 28a, 28b shown in FIG. 1, the computer 24 may determine that the first and second messages commanding the doors be locked and unlocked, respectively, conflict with each other.

Although not illustrated in the process 500, the computer 24 may determine that the additional messages include commands that conflict with commands of the first and second message and with commands of any other of the additional received messages. The computer 24 may execute the command of any message that is not in conflict with the commands of any of the other messages, as described for the block 525. The computer 24 may select a message from among the messages that have commands in conflict, as described for the block 530 and beyond.

At the block 525, the computer 25 actuates the vehicle 22 based on the messages received from the first input device 23 at the block 510 and second input device 23 at the block 515. After the block 525 the process 500 may end. Alternatively, the process 500 may return to the block 505.

Although not illustrated in the process 500, the computer 24 may actuate the vehicle 22 based on commands in any received message that do not conflict with commands of other messages.

At the block 530 the computer 24 selects an order of priority determinations. The computer 24 may select one and only one order of priority determinations, e.g., when only one order of priority determinations is stored in memory. The computer 24 may alternatively select from among a plurality of orders of priority determinations based on the commands of the messages. The computer 24 may use a default order of priority determinations, e.g., when the computer 24 is unable to select an order of priority determinations based on the commands. In other words, when the commands of the messages are not included in a look up table used for selecting an order of priority determinations, such as Table 4 described above, the computer 24 may select a default order of priority determinations for use when determining priority of the messages.

For example, with continued reference to the above example, the computer 24 may select an order of priority determinations based on the commands to unlock/lock the doors. The selected order of priority determinations may order the priority determinations as follows: 1. Device Priority; 2. User Priority; 3. Location Based Priority; 4. Temporal Priority.

At a block 535 the computer 24 determines whether the first message from the first input device 23 has priority over the second message from the second input device 23 based on the first enumerated priority determination in the order of priority determinations selected at the block 530. Upon determining that the first message has priority over the second message, the computer 24 selects the first message and the process 500 moves to a block 570. Upon determining that the first message does not have priority over the second message, the process 500 moves to a block 540.

For example, with continued reference to the above example, the computer 24 may determine that the first message from the remote input device 28a that is a "general remote" type has priority over the second message from the remote input device 28b that is a "dedicated remote" type based on device 23 priority. The computer 24 then selects the first message and moves to the block 570.

Although not illustrated in the process 500, the computer 24 may determine whether the first message from the first input device 23 has priority over additional messages received from additional input devices 23 based on the first enumerated priority determination in the order of priority determinations selected at the block 530. Upon determining that the first message has priority over the additional messages the computer 24 selects the first message and the process 500 moves to the block 570. Upon determining that the first message does not have priority over the additional messages the process 500 moves to a block 540.

At the block 540 the computer 24 determines whether the second message from the second input device 23 has priority over the first message from the first input device 23 based on the first enumerated priority determination in the order of priority determinations selected at the block 530. Upon determining that the second message has priority over the first message the computer 24 selects the second message and the process 500 moves to a block 595. Upon determining that the second message does not have priority over the first message the process 500 moves to a block 545.

Although not illustrated in the process 500, the computer 24 may determine whether the second message from the second input device 23 has priority over the additional messages received from the additional input devices 23 based on the first enumerated priority determination in the order of priority determinations selected at the block 530. Upon determining that second message has priority over the additional messages the computer 24 selects the second message and the process 500 moves to the block 595. Upon determining that the second message does not have priority over the additional messages, the computer 24 may determine whether each of the additional messages have priority over the first message, the second message, and the additional messages based on the first enumerated priority determination in the order of priority determinations selected at the block 530. Upon determining that one of the messages has priority over all other messages the computer 24 selects the determined highest-priority message and actuates the vehicle 22 based on commands included in the determined message, e.g., as described for the first message in the block 570. Upon determining that none of the messages have priority over all other messages the computer 24 the process moves to the block 545.

At the block 545 the computer 24 determines whether the first message from the first input device 23 has priority over the second message from the second input device 23 based on the second enumerated priority determination in the order of priority determinations selected at the block 530. Upon determining that the first message has priority over the second message the computer 24 selects the first message, and the process 500 moves to the block 570. Upon determining that the first message does not have priority over the second message the process 500 moves to a block 550.

Although not illustrated in the process 500, the computer 24 may determine whether the first message from the first input device 23 has priority over additional messages received from additional input devices 23 based on the second enumerated priority determination in the order of priority determinations selected at the block 530. Upon determining that the first message has priority over the additional messages the computer 24 selects the first message and the process 500 moves to the block 570. Upon determining that the first message does not have priority over the additional messages the process 500 moves to a block 550.

At the block 550 the computer 24 determines whether the second message from the second input device 23 has priority over the first message from the first input device 23 based on the second enumerated priority determination in the order of priority determinations selected at the block 530. Upon determining that the second message has priority over the first message, the computer 24 selects the second message and the process 500 moves to the block 585. Upon determining that the second message does not have priority over the first message, the process 500 moves to a block 555.

Although not illustrated in the process 500, the computer 24 may determine whether the second message from the first input device 23 has priority over additional messages received from additional input devices 23 based on the first enumerated priority determination in the order of priority determinations selected at the block 530. Upon determining that second message has priority over the additional messages the computer 24 selects the second message and the process 500 moves to the block 585. Upon determining that the second message does not have priority over the additional messages, the computer 24 may determine whether each of the additional messages have priority over the first message, the second message, and the other additional messages based on the second enumerated priority determination in the order of priority determinations selected at the block 530. Upon determining that one of the messages has priority over all other messages the computer 24 selects such message and actuate the vehicle 22 based on commands included in such message, e.g., as described for the first message in block 570. Upon determining that none of the messages have priority over all other messages, the computer 24 may move to the block 555.

As an alternative to moving to block 555, the computer 24 may first determine whether the first message from the first input device 23, the second message from the second input device 23, additional messages from additional input devices, etc., have priority based on third, fourth, etc., enumerated priority determinations in the order of priority selected at the block 530, e.g., as described above. Upon determining that one of the messages has priority over all other messages, the computer 24 selects such message and actuates the vehicle 22 based on commands included in the determined highest-priority message, e.g., as described for the first message in block 560. Upon determining that none of the messages have priority over all other messages, the computer 24 moves to the block 555.

At the block 555 the computer 24 provides the commands of the first message and the second message to a user via the first input device 23 and/or the second input device 23. The computer 24 provides the commands based on a capability of the first and second input devices to display the commands, e.g., to input device 23 having a touch screen or like display. The capabilities of the first input device 23 and the second input device 23 may be specified in data included in the first and second messages, respectively.

Although not illustrated in the process 500, the computer 24 may provide the commands of additional messages to a used via the first input device, the second input device 23, and/or other input device 23 based on a capability of the input devices 23 to display the commands.

Next at the block 560 the computer 24 receives a message from the first or second device 23 (or third device, etc.) including data specifying a selected command from among the commands provided in the block 555 (e.g., via user input to one of the input devices 23).

At a block 565 the computer 24 determines whether the command received at the block 550 is the command included in the first message from the first input device. Upon determining the command received at the block 550 is the command included in the first message the computer 24 selects the first message and the process 500 moves to a block 570. Upon determining that the command received at the block 550 is not the command included in the first message the process 500 moves to the block 585.

Although not illustrated in the process 500, the computer 24 may make additional determinations to identify which additional message from one of the additional input devices 23 included the selected command at the block 560. The computer may then actuate the vehicle 22 based on such message, as described in the block 570, including ignoring all unselected messages, as well as ignoring message from the input devices 23 that provided the unselected messages for a threshold amount of time, e.g., as described for block 575-590.

At the block 570 the computer 24 actuates the vehicle 22 based on the first message from the first input device 23 and refrains from actuating the vehicle 22 based on the second message from the second input device 23. After the block 570 the process 500 may move to a block 575, alternatively the process 500 may end or return the block 505.

For example, with continued reference to the above example, the computer 24 may command actuate locks of doors of the vehicle to a locked state that prohibits the doors from opening.

At the block 575 the computer 24 receives a third message from the second input device 23.

For example, with continued reference to the above example, the computer 24 may receive a third message from the remote input device 28b specifying a command to unlock doors of the vehicle 22.

Next, at the block 580, the computer 24 determines whether a threshold amount of time has passed since executing the block 570. The threshold amount of time, e.g., 30 seconds, may be prestored in memory of the computer 24, provided to the computer 24 via the user interface 40, etc. Upon determining that the threshold amount of time has passed the process 500 moves to the block 585. Upon determining that the threshold amount of time has not passed the process 500 moves to the block 590.

At the block 585 the computer 24 actuates the vehicle 22 based on the third message received from the second input device 23 at the block 575. After the block 585 the process 500 may end. Alternatively, the process 500 may return to the block 505.

For example, with continued reference to the above example, the computer 24 may actuate the vehicle 22 to unlock doors of the vehicle 22.

At the block 590 the computer 24 refrains from actuating the vehicle 22 based on the third message received from the second input device 23 at the block 575. In other words, the computer 24 ignores the message received from the second input device 23 at the block 575. After the block 580 the process 500 may end. Alternatively, the process 500 may return to the block 505.

For example, with continued reference to the above example, the computer 24 may refrain from actuating the vehicle 22 to unlock doors of the vehicle 22.

As an alternative to ignoring the third message the computer 24 may provide the command of the third message to a user, e.g., via the first input device 23. The first input device 23 may also display an option for the user to execute or ignore such command. The user selection to execute or ignore the command may be received by the computer 24 in a message from the input device 23 and including data specifying such selection. The computer 24 may execute the command and actuate the vehicle 22 or may ignore the command based on such selection.

At the block 595 the computer 24 actuates the vehicle 22 based on the second message from the second input device 23 and refrains from actuating the vehicle 22 based on the first message from the first input device 23.

At a block 600 the computer 24 receives a fourth message from the first input device 23.

Next, at a block 605, the computer 24 determines whether a threshold amount of time has passed since executing the block 595. Upon determining that the threshold amount of time has passed the process 500 moves to a block 610. Upon determining that the threshold amount of time has not passed the process 500 moves to a block 615.

At the block 610 the computer 24 actuates the vehicle 22 based on the fourth message received from the first input device 23 at the block 590. After the block 610 the process 500 may end. Alternatively, the process 500 may return to the block 505.

At the block 615 the computer 24 refrains from actuating the vehicle 22 based on the fourth message received from the first input device 23 at the block 590. After the block 605 the process 500 may end. Alternatively, the process 500 may return to the block 505.

As an alternative to ignoring the fourth message the computer 24 may provide the command of the fourth message to a user for selection of whether to execute or ignore such command, e.g., as described above for the third message.

CONCLUSION

With regard to the process 500 described herein, it should be understood that, although the steps of such process 500 have been described as occurring according to a certain ordered sequence, such process 500 could be practiced with the described steps performed in an order other than the order described herein. It further should be understood that certain steps could be performed simultaneously, that other steps could be added, or that certain steps described herein could be omitted. In other words, the description of the process 500 herein is provided for the purpose of illustrating certain embodiments and should in no way be construed so as to limit the disclosed subject matter.

Computing devices, such as the computer 24 of the vehicle, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a processor; and
a memory storing instructions executable by the processor to:
select one of a first message from a first input device or a second message from a second input device based on a navigation direction of a vehicle as compared to respective locations of the first input device and the second input device relative to the vehicle; and
actuate the vehicle based on the selected first or second message.

2. The system of claim 1, the instructions further including instructions to refrain from actuating the vehicle based on the first message or the second message that was not selected.

3. The system of claim 1, wherein the first input device is a component of the vehicle.

4. The system of claim 1, wherein the second input device is a remote input device in wireless communication with the vehicle.

5. The system of claim 1, wherein the instructions further include instructions to actuate the vehicle based on a third message from either the first input device or the second input device upon determining a threshold amount of time has lapsed since receiving the selected first message or second message.

6. The system of claim 1, wherein the instructions further include instructions to select the first message or the second message based on a comparison of a proximity of the first input device relative to the vehicle and a proximity of the second input device relative to the vehicle.

7. The system of claim 1, wherein the instructions further include instructions to select the first message or the second message based on a location of a user providing input to the first input device or the second input device.

8. The system of claim 1, wherein the instructions further include instructions to actuate at least one of a propulsion system, a braking system, and a steering system of the vehicle based on the selected first message or second message.

9. A method, comprising:
selecting one of a first message from a first input device or a second message from a second input device based on a comparison of a proximity of the first input device relative to the vehicle and a proximity of the second input device relative to the vehicle; and
actuating a vehicle based on the selected first or second message.

10. The method of claim 9, further comprising refraining from actuating the vehicle based on the first message or second message that was not selected.

11. The method of claim 9, further comprising actuating the vehicle based on a third message from either the first input device or the second input device upon determining a threshold amount of time has lapsed since receiving the selected first message or second message.

12. The method of claim 9, further comprising selecting the first message or the second message based on a navigation direction of the vehicle.

13. The method of claim 9, further comprising selecting the first message or the second message based on a location of a user providing input to the first input device or the second input device.

14. The method of claim 9, further comprising actuating at least one of a propulsion system, a braking system, and a steering system of the vehicle based on the selected first message or second message.

15. A system, comprising:
means for selecting one of a first message from a first input device or a second message from a second input device based on a comparison of a proximity of the first input device relative to the vehicle and a proximity of the second input device relative to the vehicle; and
means for actuating a vehicle based on the selected first message or second message.

16. The system of claim 15, further comprising means for refraining from actuating the vehicle based on the first message or second message that was not selected.

* * * * *